United States Patent [19]

Auinger

[11] Patent Number: 4,641,051
[45] Date of Patent: Feb. 3, 1987

[54] ROTOR FOR AN ELECTRICAL MACHINE WITH AXIAL AND RADIAL COOLING CHANNELS

[75] Inventor: Herbert Auinger, Nuremberg, Fed. Rep. of Germany

[73] Assignee: Siemens Aktiengesellschaft, Munich and Berlin, Fed. Rep. of Germany

[21] Appl. No.: 710,093

[22] Filed: Mar. 11, 1985

[30] Foreign Application Priority Data

Mar. 12, 1984 [DE] Fed. Rep. of Germany ....... 3408986

[51] Int. Cl.⁴ ............................................. H02K 9/14
[52] U.S. Cl. ..................................... 310/61; 310/261
[58] Field of Search ................. 310/52, 54, 60 A, 61, 310/63, 65, 216, 217, 218, 259, 261

[56] References Cited

U.S. PATENT DOCUMENTS

| | | | |
|---|---|---|---|
| 891,906 | 6/1908 | Card | 310/65 |
| 2,947,892 | 8/1960 | Inculet et al. | 310/61 |
| 3,435,263 | 3/1969 | Willyoung | 310/61 |
| 3,846,651 | 11/1974 | Mishra | 310/61 |
| 3,955,111 | 5/1976 | Weghaupt | 310/61 |
| 4,341,966 | 7/1982 | Pangburn | 310/61 |

OTHER PUBLICATIONS

"Luefterwirkung, Luftverteilung und Ventilationsverluste an achsnormal geschlitzten Rotoren fuer grosse elecktrische Maschinen," by F. Wressnigg (a doctoral dissertation at the University of Berlin in 1972).

*Primary Examiner*—Patrick R. Salce
*Assistant Examiner*—D. L. Rebsch
*Attorney, Agent, or Firm*—F. W. Powers; J. L. James

[57] ABSTRACT

A rotor for an electrical machine having standard axial cooling channels extending the length of the rotor, feeding regularly spaced radial cooling channels. The cooling distribution of the air flow coming into the rotor from the frontal sides is improved by blocking off some of the flow into the central radial channels, which in standard designs are excessively cooled, and thereby forcing the air flow to cool other radial channels better. By more evenly distributing the cooling air flow, less air flow is required, thereby saving energy. The invention is readily adaptable to various rotor configurations.

10 Claims, 7 Drawing Figures

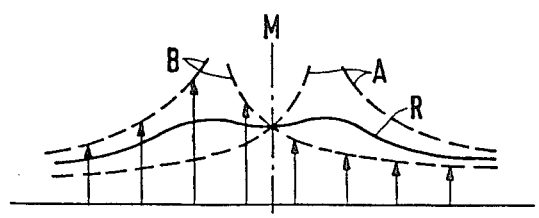
FIG 4
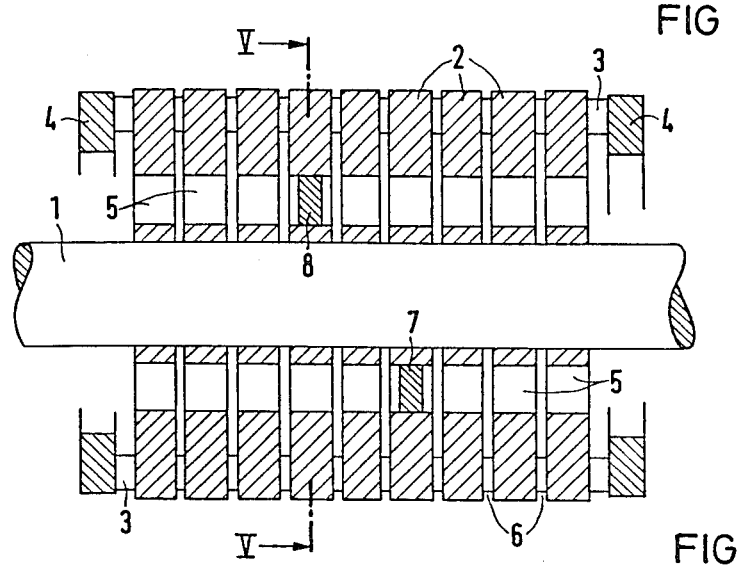
FIG 2
FIG 3
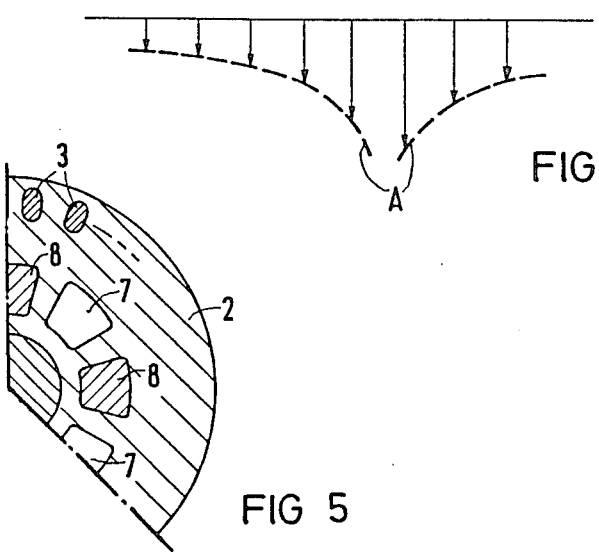
FIG 5

4,641,051

ROTOR FOR AN ELECTRICAL MACHINE WITH AXIAL AND RADIAL COOLING CHANNELS

BACKGROUND OF THE INVENTION

This invention relates to rotors for large, high-capacity, internally ventilated electrical machines, in particular, such rotors which have a cooling air flow penetrating from both frontal sides into axial cooling channels of the rotor, e.g. cross ventialtion, either by the fan action of the standard spacer webs in the individual radial cooling channels between the rotor lamination components and/or through open sections of the rotor winding or in some cases by a cooling air flow induced by separate frontally mounted fans.

Typiclly in such a rotor the axial cooling channels can be formed by openings spaced concentrically around the rotor shaft in the yoke area of the axially subdivided rotor laminations, or through the axial interspaces of a webbed shaft for the rotor laminations.

In a standard rotor having lamination components, arranged equidistantly with radial cooling channels of the same cross section positioned at equal intervals, there is an uneven air distribution from the frontal sides of the rotor to the rotor center, which depends upon the ratio of the axial channel to the radial channel cross section as shown by F. Wressing (dissertation, Berlin Technical University, 1972, "Ventilation Effect, Air Distribution and Ventilation Losses in Normal Axially Slotted Rotors for Large Electrical Machines"). According to that study, in the individual axial cooling channels the flow velocity in a symmetrically ventilated rotor begins initially slowly from the frontal sides to the rotor center and then increases markedly towards the rotor center such that the mid-sections are subjected to a much greater cooling action than the edge areas of the rotor. This means in the standard rotor design that, while some of the end sections of the rotor are getting the minimum required cooling, the mid-sections are receiving excessive cooling air distribution. This means the standard rotor expends more fan energy than necessary, cooling the mid-sections of the rotor; thereby, reducing overall efficiency.

The standard rotor lamination components design is also inflexible in that there is no provision for a case where the inflow conditions at one frontal side is different than the inflow at the other frontal side.

A modified rotor design having an uneven distribution of axial and radial cooling channels in such a manner that the cross sections would be smaller as they approcahed the rotor center in order to assure better cooling of the edge areas than of the inner area of the rotor would require varying stamped plates and varying spacers between the rotor lamination components, as well as a correspondingly more expensive assembly process. In addition, for manufacturing and operating reasons, the radial cooling channels cannot be made in the dimension required for this arrangement in widths below 6 to 8 mm, thus making this type of cooling distribution economically unattractive.

Accordingly, it will be appreciated that it would be highly desireable to provide rotor lamination components that had more even cooling air flow distributions which used equidistant spacings and evenly distributed channels, had ease of manufacturing, and yet has the flexibility to adapt to unsymmetrical air flows.

It is an object of this invention to provide a more even distribution of the cooling air and a more constant cooling air volumetric flow overall, while reducing the fan losses in a design, using uniformly stamped rotor plates and uniform spacers, given an axially even arrangement of the rotor lamination components. It is another object of this invention to provide a more even distribution of the cooling air and a constant cooling air volumetric flow overall, while reducing fan losses, in a design using uniformly stamped rotor plates an uniformed spacers, given an axially even arrangement of the rotor lamination components even in the case of uneven frontal side cooling air inflow conditions.

SUMMARY OF THE INVENTION

Briefly stated in accordance with one aspect of the invention, the foregoing objects are achieved by providing a rotor of an electrical machine which has both axial and radial cooling channels supplied with cooling air from both frontal sides blown towards the outer rotor shell surfaces through the axial and radial cooling channels. To provide a more even distribution of the cooling air, blocking surfaces are inserted at axial displacements from the center of the rotor into the axial cooling channels.

In another aspect of the invention, the objects are achieved by providing a rotor of an electrical machine which has both axial and radial cooling channels supplied with cooling air from both frontal sides blown through the axial cooling channels into the radial cooling channels out towards the rotor shell surface as previously. However, instead of inserting blocking surfaces into all the axial cooling channels at axial displacements from th center of the rotor, some of the axial cooling channels are left unblocked.

BRIEF DESCRIPTION OF THE DRAWINGS

While the specification concludes with claims particularly pointing out distinctly claiming the subject matter which is regarded as the invention, it is believed that the invention will be better understood from the following description of the embodiments taken in conjunction with the accompanying drawings in which:

FIG. 2 is a longitudinal cross section of a squirrel-cage rotor along section line II—II of FIG. 1;

FIGS. 3 and 4 are envelope curves of the air velocity distribution in the radial cooling channels, given mirror-image symmetrical offset blocking surfaces in the axial cooling channels towards the rotor center;

FIG. 5 is a cross section through the item depicted in FIG. 2 along elevation V—V in FIG. 2;

DESCRIPTION OF A PREFERRED EMBODIMENT

Figure 1:
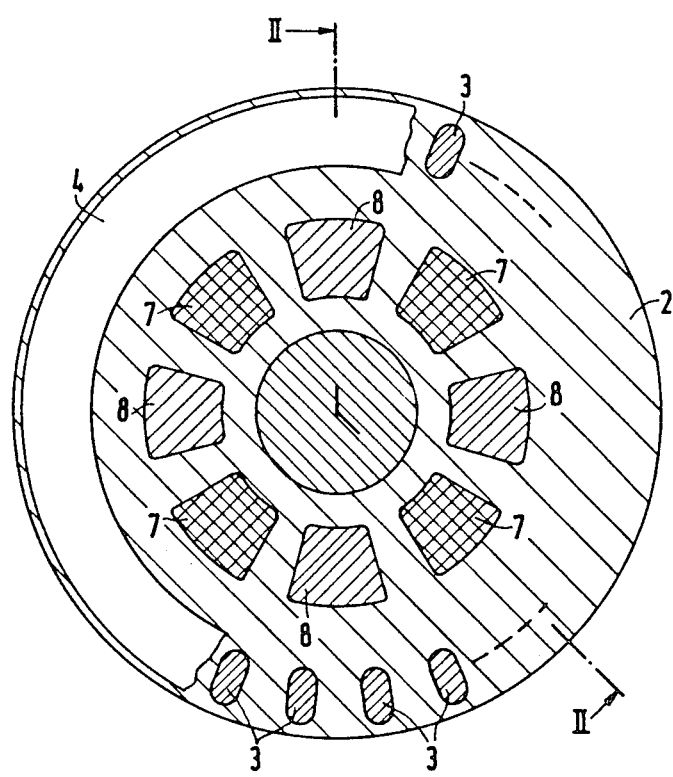
FIG. 1 is a partially cut away frontal side view of the rotor.

The invention is explained in reference to an embodiment shown in FIG. 1 with a squirrel cage rotor having symmetrical inflow conditions on both sides and having rotor lamination components 2 arranged at regular axial spacings along the rotor shaft 1. On rotor shaft 1 the squirrel-cage rotor has rotor laminations subdivided into numerous identical rotor lamination components 2, which are always evenly spaced by radial cooling channels 6. Each rotor lamination component 2 has in its yoke area axial cooling channels 5 symmetrically arranged around the rotor shaft 1, which mate in the individual rotor lamination components and provide air flow into the radial cooling channels.

The squirrel cage rods 3 are connected on their frontal side to short-circuit rings 4, which under given circumstances can also be designed as fans. The cage rods 3 functions as fans in the area of the radial cooling channels 6, along with the spacer webs arranged in the standard fashion (not further depicted), which assure the spacing of the individual components.

Each rotor lamination component 2 has an even number of axial cooling channels 5, of which every other one of a center-offset laminate component contains a blocking surface 7 or 8. The other laminate components have the standard free axial cooling channels. The blocking surfaces 7 are thus located in every other axial cooling channel of the laminate component adjoining the central laminate component on the right-hand side, and the blocking surfaces 8 are offset around an axial cooling channel and located in every other axial cooling channel of the laminate component adjoining on the left-hand side as per FIG. 2.

For the individual radial cooling channels a cooling-air velocity distribution in accordance with the envelope curve A per FIG. 3 is generated in the circumferential zones affected by the blocking surfaces 7 in the respective axial cooling channels. The same applies to the circumferential zones affected by blocking surface 8 in the respective axial cooling channels in accordance with envelope curve B in FIG. 4. The thinner drawn curve A shown in FIG. 4 for the adjoining sections generates the resulting flow distribution in accordance with curve R when superimposed on curve B as the average value for all radial cooling channels. As can be seen by blocking surface 7, 8, a more even ventilation and thus cooling of the rotor is attained in a very simple fashion.

Figure 7:
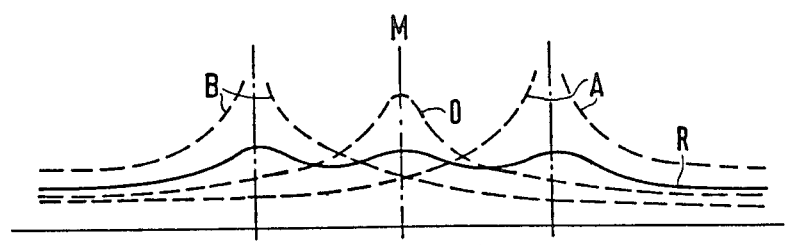
FIG. 7 shows the envelope curves arising in a rotor arrangement according to FIG. 5 for the velocity distribution in the respective circumferential sections of the radial cooling channels, as well as the resulting average cooling air distribution.
Figure 6:
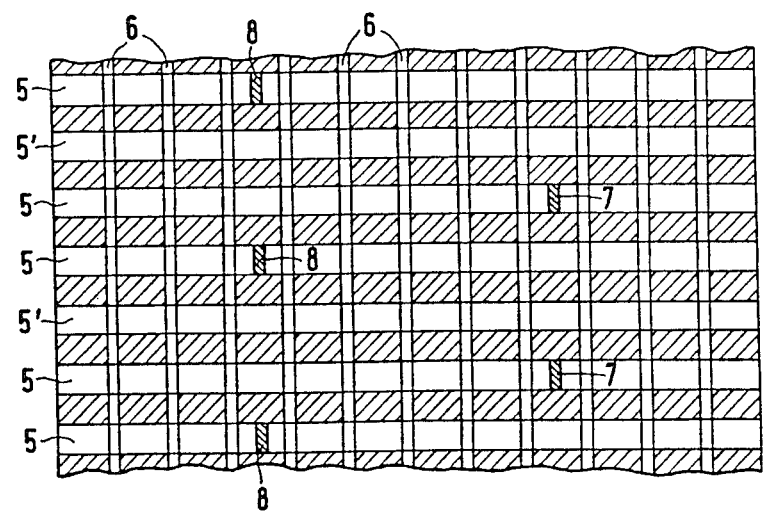
FIG. 6 is a schmatic plane projection of a rotor arrangement with right/left offset blocking surfaces in the axial cooling channels and continuously free axial cooling channels in alternating sequence.

Another embodiment of the invention is illustrated by the rotor projection in FIG. 6. Here the axial cooling channels 5, and the blocking surfaces 7, 8 are again arranged offset axially and alternately in the opposite direction to midpoint M. The envelope curves A and B in FIG. 7 correspond to these blocking surfaces. Between the axial cooling channels 5 free axial cooling channels 5' are retained which have no blocking surfaces, thereby producing an attributed envelope curve 0 in FIG. 7. From the envelope curves A, B and O we then obtain a resulting average velocity distribution as per curve R. In this arrangement, multiples of 3, i.e., even or uneven, axial cooling channels can be used.

As per known designs, the axial channels emptying into the radial channels can also be formed by web shafts themselves in place of smooth rotor shafts 1 and stamped cutouts in the rotor yoke. If in each of the axial cooling channels in FIGS. 1, 2 and 5 blocking surfaces are installed, then it is preferrable to utilize an even number of axial cooling channels so that the local velocity distributions appear, as specified in envelope curves A and B, in a consistently even number of circumferential areas, and so that along the rotor circumference as constant a resulting average velocity distribution in accordance with curve R prevails as possible.

The embodiments illustrated in FIGS. 2 and 6 assumed symmetrical cooling air inputs from the two frontal sides into the axial channels. In such cases the midpoint of axial air flow (i.e., where the net axial velocity would be zero) if the axial channels were unblocked coincides with the physical midpoint of the rotor. In the case of asymmetric cooling air inputs, however, the offset axial spacing of the blocking surfaces would be from the air flow midpoint (i.e., zero point) of the net axial flow, were the axial channels not blocked.

It will now be understood that there has now been disclosed a rotor with improved cooling air flow, using standard manufacturing techniques and inserting new flow blocking surfaces at advantageous locations in the axial flow channels. Further, although this invention typically will be used on a rotor having symmetrical air flow from both frontal faces, it is disclosed how to adapt the invention for cases of asymmetric air flow. As will be evident from the foregoing description, certain aspects of the invention are not limited to the particular details of the examples illustrated, and it is therefore contemplated that other modifications or applications will occur to those skilled in the art, for instance, wound rotors, slip ring motor rotors, d.c. armatures, and magnet wheels of synchronous units such as non-salient pole rotor designs. It is accordingly intended that the claims shall cover all such modifications and applications as do not depart from the true spirit and script of the invention.

What is claimed as new and desired to be secured by Letters Patent of the United States is:

1. A rotor for an electrical machine with a plurality of axially extending cooling channels and a plurality of radially extending cooling channels in said rotor into which cooling air supplied from both rotor frontal sides is blown, said cooling air flowing axially towards the rotor center and radially towards the outer rotor shell surfaces, characterized by having a plurality of blocking surfaces, each of said plurality of blocking surfaces respectively located in one of the plurality of axially extending cooling channels and axially offset, with respect to each respective frontal side and with respect to the rotor center, from the blocking surface in the adjacent axially extending cooling channel providing a more uniform cooling distribution than the same rotor without blocking surfaces.

2. A rotor according to claim 1, further characterized by having the number of axially extending cooling channels be even and said blocking surfaces in the individual axially extending cooling channels be offset axially from the frontal sides in the direction of the rotor center positioned at an equal distance from the rotor center.

3. A rotor according to claim 1, further characterized by having each of said blocking surfaces which are axially offset in the same direction to the rotor center from one of the frontal sides be positioned at an equal distance from the rotor center.

4. A rotor according to claim 1, further characterized by having individual axially extending cooling channels alternately be without blocking surfaces therein.

5. A rotor of an electrical machine with a plurality of axially extending cooling channels an a plurality of radially extending cooling channels therein into which cooling air supplied from both rotor frontal sides is blown, said cooling air flowing axially towards an air flow midpoint and radially towards the outer rotor shell surfaces, characterized by having a plurality of blocking surfaces located in the plurality of axially extending cooling channels axially offset towards the air flow midpoint from each respective frontal side providing a more uniform cooling distribution.

6. A rotor according to claim 5, further characterized by having each of said blocking surfaces which are axially offset in the same direction from said air flow midpoint be positioned at an equal distance from said air flow midpoint.

7. A rotor for an electrical machine with axial and radial cooling channels, having equally wide radial cooling channels and equally wide axial cooling channels arranged symmetrically relative to the rotor axis between the rotor metal laminations, so that the cooling air that blows towards an outer radial surface of the rotor is conducted to the axial cooling channels from both frontal sides of the rotor, characterized by having a plurality of blocking surfaces, each arranged in one of the axial cooling channels respectively at an axial distance from the rotor center and alternating first toward one of the frontal sides and then the other frontal side from the rotor center between respective adjacent axial cooling channels.

8. A rotor according to claim 7, further characterized by having the number of axial cooling channels be even and said blocking surfaces in the individual axial cooling channels offset axially from the frontal sides in the direction of the rotor center be positioned at an equal distance from the rotor center.

9. A rotor according to claim 7, further characterized by having each of said blocking surfaces which are axially offset in the same direction from the rotor center toward one of the frontal sides be positioned at an equal distance from the rotor center.

10. A rotor according to claim 7, further characterized by having individual axial cooling channels alternately be without blocking surfaces therein.

* * * * *